(12) United States Patent
Prabhasankar et al.

(10) Patent No.: US 7,172,784 B2
(45) Date of Patent: Feb. 6, 2007

(54) EMULSIFIER COMPOSITION FOR CAKES AND A METHOD OF MAKING IMPROVED QUALITY CAKES THEREOF

(75) Inventors: Pichan Prabhasankar, Karnataka (IN); Jyotsna Rajiv, Karnataka (IN); Dasappa Indrani, Karnataka (IN); Gandham Venkateshwara Rao, Karnataka (IN)

(73) Assignee: Council of Scientific & Industrial Research, New Delhi (IN)

( * ) Notice: Subject to any disclaimer, the term of this patent is extended or adjusted under 35 U.S.C. 154(b) by 662 days.

(21) Appl. No.: 10/400,932

(22) Filed: Mar. 28, 2003

(65) Prior Publication Data

US 2004/0191387 A1    Sep. 30, 2004

(51) Int. Cl.
*A23L 1/035* (2006.01)
*A21D 10/04* (2006.01)

(52) U.S. Cl. ...................... 426/653; 426/553
(58) Field of Classification Search ............ None
See application file for complete search history.

(56) References Cited

U.S. PATENT DOCUMENTS

| | | | | |
|---|---|---|---|---|
| 4,012,533 A | * | 3/1977 | Jonas | 426/565 |
| 4,242,366 A | * | 12/1980 | Morgan et al. | 426/554 |
| 4,680,184 A | * | 7/1987 | Seiden et al. | 426/654 |
| 5,178,897 A | * | 1/1993 | Tanaka et al. | 426/602 |
| 5,534,285 A | * | 7/1996 | Setser | 426/552 |
| 6,068,876 A | * | 5/2000 | Miller et al. | 426/604 |
| 6,410,073 B1 | * | 6/2002 | McPherson et al. | 426/549 |
| 6,410,074 B1 | * | 6/2002 | McPherson et al. | 426/549 |

OTHER PUBLICATIONS

Pierce, M. M. et al. 1987. Cereal Chemistry 64(4)222-225.*
Kim, C. S. et al. 1992. Cereal Chemistry 69(2)212-217.*
MacDonald, I. A. et al. 1988. Cereal Chemistry 43:571-584.*

* cited by examiner

*Primary Examiner*—Carolyn Paden
(74) *Attorney, Agent, or Firm*—Nath & Associates PLLC; Harold L. Novick

(57) ABSTRACT

The present invention relates to an emulsifier composition useful for making improved quality cakes, said emulsifier composition comprising 15.4 to 15.8 parts of Distilled glycerol monostearate (DGMS), 15.4 to 15.8 parts of Poly glycerol monostrearate (PGMS), 1.0 to 1.4 parts of Sodium stearoyl-2-lactylate (SSL), 15.4 to 15.8 parts of Polysorbate-60 (PS-60), 15.4 to 15.8 parts of Sorbitan monostearate, 0.12 to 0.16 parts of Sodium dodeceyl sulphate (SDS), 5.0 to 7.0 parts of glycerol and 0.5 to 1.5 parts of lactic acid on 100 parts of water and also a process for preparing the same.

15 Claims, No Drawings

EMULSIFIER COMPOSITION FOR CAKES AND A METHOD OF MAKING IMPROVED QUALITY CAKES THEREOF

FIELD OF THE INVENTION

The present invention relates to an emulsifier composition for cakes and a method for making improved quality cakes thereof.

BACKGROUND AND PRIOR ART DESCRIPTION

The bakery industry in India has now occupied a significant place in industrial sector. It represents one of the largest organised food processing industries in the country having a turn over of Rs.5, 000 crores. The bakery industry produces a variety of products to cater to all sections of population (Vikas Singhal, 1999, Indian Agriculture, Indian Economic Data Research Center, pp 72–83). The annual production of bakery products which includes bread, biscuits, pastries, cakes, rusks etc., most of which are in the unorganised sector, is estimated to be in excess of 30 lakh tonnes (India 2001. Reference Annual, Ministry of Information & Broad Casting, Govt., of India). There is a steady increase in the production and consumption of cakes especially those generally known as Tea cake/Bar cake/Slice cake which are manufactured and marketed on large scale in packed form even by the medium scale baking units. Although cakes may differ substantially in their fat content, they are all definitely benefited by the incorporation of an emulsifier or a combination of emulsifiers. Extremes of fat addition to cakes are represented by pound cake on the one hand, and by sponge cake on the other. Some formulas for pound cake require a weight of shortening equal to that of the flour or 100% in baker's terminology whereas sponge cake is made without any added shortening. Usually, the amount of fat in cake making ranges from 35–50% based on the flour in the formula. Despite the variations in shortening levels, all types of cakes, including sponge cake are improved by the action of emulsifiers. The term emulsifier is used to describe these ingredients because they all exhibit some ability to emulsify oil and water. Starch complexing, protein strengthening and aeration are the primary functions of emulsifiers. Cereal based foods constitute the largest end-use group of application for emulsifiers. (David Rusch .T., 1981. Emulsifiers: Uses in Cereal and bakery foods, Cereal Food World, 26(3): 111–115) Emulsifiers are important functional additives in modem food processing. Emulsifiers are surface-active ingredients that can emulsify and stabilise emulsions and perform many diverse functions in food product development. With the growing economic importance of the sweet goods sector, including cakes, cookies, whipped toppings and icings there is a growing awareness of the need to develop emulsifiers to serve this group of products. As the needs of the sweet goods industry become more complex, ongoing technology and product development efforts have resulted in a wide range of emulsifiers. Ideal emulsifier meets to contribute to enhanced emulsification, aeration, foam stabilization and starch complexing. Monoglycerides are the most basic and predominant class of emulsifiers, both in terms of technical importance and in total usage, which by some accounts make up 65–75% of total emulsifier usage. (Silva R. F., 2000, Uses of alpha crystalline emulsifiers in the sweet goods industry, Cereal Food World, 45(9): 405–410) Each bakery has its own way of preparation of emulsifiers. The need of the hour for bakers would be the water-based emulsifier system. The bakers' need is to be exploited and there is a good growth potential for the industries, which manufacture the cakes. Moreover, the emulsifier system can be useful to small as well as large scale bakeries.

Emulsifiers or surfactants are used extensively in baked goods to improve product volume, tenderize crumb, slow the rate of crumb firming, etc. such emulsifiers and surfactants are also known in baked goods industry as crumb softners, antistaling agents, dough conditioners and the like. Hereinafter, the term emulsifier will be used to represent both emulsifiers and surfactants.

The mechanism for emulsifier functionality is well known and is related to amphiphilic character and resulting surface activity of the emulsifier. The use of emulsifiers in specific applications is guided not only by the hydrophilic lipophilic balance (HLB) of the emulsifier but also by handling characteristics conferred by its physical form (e.g., plastic powdered beads, flakes). Thus, as proper dispersion of the emulsifier is crucial to its ability to function in an application, the baking industry generally uses plasticised shortening—like emulsifiers, preheated paste like emulsifiers, fine powdered emulsifiers (especially dry mixes), or some combinations of these, for ease of processing (Pyler, E. J. 1988. Baking Science & Technology, $3^{rd}$ ed. Sosland Publishing Company, Merriam, Kans.). It is desirable to produce an emulsifier system that enhances batter aeration, increases cake volume, produces a finer and more even structure with softer texture, and improves storage qualities.

Emulsification of fat in cake batter is one of the many functions of surfactant. Another characteristic of these additives is their ability to control crystal transformation of fats.

They have ability to interact with starch and protein. They improve the shortening action of fat by increasing its spreadability on the starch granules and protein strands. In cakes, emulsifiers provide such quality improvement as large volume, finer grain and texture, a more tender crumb, improved eating quality, a higher degree of symmetry and extension of keeping quality (Birnbaum H., 1978 Surfactants and Shortenings in Cake making, The Baker's Digest, 28–38). There is no doubt that cake batter is an emulsion. Different emulsifiers such as polysorbate 65, polysorbate 80, sodium lauryl sulphate, sorbitan monosterate, polysorbate 60, monoglyceride citrate, calcium stearoyl-2-lactylate, diacetyl sodium sulfosuccinate, sodium stearoyl fumarate, succinylated mono glycerides, sodium stearoyl lactylate, ethoxylated mono and diglycerides etc., will give different emulsion characteristics in the batter system. Most of the emulsifiers decrease the batter specific gravity except in the case of DMG for slight increase at low levels. In all cases, cake volumes improved (Del Vecchio. 1975. Emulsifiers and their use in soft wheat products. The Bakers Digest, 28–35, 52).

Reference may be made to Mac Donald and Douglas Bly. 1966 Determination of optimal levels of several emulsifiers in cakes mix shortenings. Cereal Chemistry 43, 571–584) wherein four emulsifiers, monoglycerides (GMS), sorbitan monostearate (SMS), Polyoxyethylene (22), sorbitan monostearte (PBS-60) and glycerol lactopalmitate (GLP) were evaluated as emulsifiers for cake mix. Results obtained from application of response surface methodology approached maximal response when combinations of all four emulsifiers were used. The proportion of each emulsifier to be used in the combination was more precisely estimated by use of a simpler design. The application of the principles of evolutionary operation (EVOP) to experimental design is believed to be unique. The results appear to justify use of such methods to determine the optimal properties of components in complex mixtures as in mix formulation.

Reference may be made to Kim and Walker 1992 Effect of sugars and emulsifiers on starch gelatinisation evaluated by differential scanning colorimetery Cereal Chemistry 69: 212–217, wherein differential scanning colorimetery (DSC) was used to evaluate the effects of sugar and emulsifier interactions on gelatinzation temperatures of three different starches.

Reference may be made to Pierce. M. M., and Walker. C. E., 1987 Addition of sucrose fatty acid ester emulsifiers to sponge cakes Cereal Chemistry 64; 222, wherein use of sucrose fatty acid emulsifier to sponge cake is described and they observed improvement of quality of sponge cakes.

Reference may be made to Wootton et al, 1967 The role of emulsifiers in the incorporation of air into layer cake batter systems Cereal Chemistry 44: 333–343, wherein the role of emulsifiers in the incorporation of air into layer cake batter system was studied. The most generally useful emulsifiers for the purpose of increasing the quality of cakes are those that have been termed as α-tending emulsifier because they tend to solidify in stable alpha crystalline form.

Although many types of emulsifiers can function effectively in cakes, several are prominent because of excellent cost/performance value. In cake mixes, the most common emulsifier in 10–15%, PGME, based on, and incorporated into, the shortening. Monoglycerides and mixtures of lactated monoglycerides with PGME also are used in cake mixes. (David. Rusch. T., 1981. Emulsifiers: Uses in Cereal and bakery food 26(3): 111–115).

Reference may be made to Del Vecchio. 1975. Emulsifiers and their use in soft wheat products. The Bakers Digest 52: 28–35, wherein the use of combination of emulsifiers like distilled monoglyceride, sorbitan monostearate, glycerol lactopalmitate and stearoyl-2-lactylic acid is described. In all cakes, volumes improved. Glycerol lactopalmitate and sorbitan monostearate produced an almost linear increase in cake volume as the level of emulsifier increased.

Reference may be made to Brooking Betty and co-inventors U.S. Pat. No. 4,242,366 (1980), wherein a blend of commercial grade emulsifiers suitable for use in a dry prepared mix, dry prepared cake mixes containing such a blend and processes for preparing same are described. The emulsifiers used are polypropylene glycol monoester, α-monoglyceride, and glycerol lacto ester. The drawback here is that the medium used for emulsifier system mainly comprises liquid triglyceride oils such as peanut oil, sesame oil, sunflower oil whereas the emulsifier composition in the present invention consist of different emulsifiers in the medium of water.

Reference may be made to Seiden and Mishkin, Martin. A., U.S. Pat. No. 4,680,184 (1987), wherein a emulsifier formulation was made for cookies. The formulation consists of 40% to 90% by weight of the composition, on the basis of monoglyceride content, fatty acid mono-glycerides having from about 35% to 99% fatty acid monoglycerides and from 1% to 50% fatty acid diglycerides, with at least 65% of said fatty acid consisting of $C_{14}$–$C_{20}$ saturated fatty acid and $C_{16}$–$C_{20}$ trans-unsaturated fatty acids and mixture thereof. The emulsifier system is meant particularly for the dual-textured cookies or drop cookies. The emulsifier system improved the texture, flavour, mouthfeel, taste and appearance of cookies. The drawback of the process is that the emulsifier system is meant for cookies, the main product is characterised by crisp texture, where as the present invention of emulsifier system is for cakes and the product is characterised by soft, moist texture.

Reference may be made to Tanaka et al U.S. Pat. No. 5,178,897 (1993) wherein the invention relates to a water-in-oil emulsion composition for bakery. It particularly relates to a water-in-oil emulsion composition for bakery, wherein an extremely high emulsion stability and a high proportion of aqueous phase can be achieved, capable of giving a product having an excellent flavour, a soft texture and a good meltability in mouth when used in particularly baked products. Though other emulsifiers are used, the particularly preferred are monoglycerides, diacetyltartaric acid monoglyceride, succinic acid and polyglycerol fatty acid esters. The aqueous phase of the emulsion composition of a high water content may further contain dairy products, common salt, sugars, puree or juice of fruits or vegetables, concentrates thereof and lactic acid fermentation products thereof as seasoning components, if required. The drawback is that the emulsion composition is composed of emulsifiers, other ingredients and has a high water content whereas in the present invention the emulsion composition is entirely a water-based one containing emulsifiers only. Also, the emulsifiers used here are different.

Reference may be made to Setser U.S. Pat. No. 5,534,285 (1996) wherein the process is concerned with reduced calorie, organoleptically acceptable cake products. Substantial reductions in high calorie cake ingredients (e.g. shortening and sugar) are possible through incorporation of relatively minor amounts of expanded liquid or gel mesophase emulsifiers into the cake batters. More particularly it is concerned with such cakes, and the starting batters wherein sweetening agent is reduced to a maximum of about 50%. Shortening is substantially, if not entirely, eliminated through use of an appropriate emulsifier system.

A variety of bulking agents such as polydextrose, sorbitol, maltitol, lactitol can be used to give appropriate structure to the final cakes. The drawback of the process is that the surfactant system invented is meant for low calorie cakes wherein the quantity of sugar and fat is reduced in the formulation and also bulking agents are added to give the structure whereas the present invention relates to the use of emulsifier system in cakes to improve the quality. The composition and the methodology of preparation of the emulsifier composition are different in this invention.

Reference may be made to Kuin Adrianus patent EP 0787434 (1917) discloses a composition comparing an emulsifier selected from propylene glycerol monoesters, monoglycerides and sodium stearyl lactate and a carrier selected from micro-particulate whey protein concentrate. The emulsifier and carrier may be co-processed by spray-drying/homogenization/other process to bring intimates commingling of components. This system is meant for baked goods. The drawback here is that the emulsifier selected here are different and it has a carrier whereas the present invention of emulsifier composition consists of different emulsifiers with no carrier system.

Reference may be made to Yuan U.S. Pat. No. 6,017,388 (2000), wherein a method of producing starch emulsifier composition by heating a starch in the presence of an emulsifier to form an elastic textured paste is described. The starch-emulsifier composition produced are useful in a variety of food and beverage applications like stabilisation of foam in ice cream, fat replacer in a variety of reduced-fat and fat-free foods such as cakes, pudding, sauces, margarine, cream cheese, yoghurt, fudge and other confections, cheeses and as a shortening in baked goods such as pies, cookies, breads, cakes, noodles, crackers and pretzels. The drawback is that the starch-emulsifier system is water based and could be used in variety of products whereas the present invention relates to the use of emulsifier composition in cakes.

OBJECTS OF THE PRESENT INVENTION

The main object of the present invention is to provide an emulsifier composition for preparing improved quality cakes.

Another object of the present invention is to provide a process for preparing the emulsifier composition.

SUMMARY OF THE INVENTION

The present invention relates to an emulsifier composition useful for making improved quality cakes, said emulsifier composition comprising 15.4 to 15.8 parts of Distilled glycerol monostearate (DGMS), 15.4 to 15.8 parts of Poly glycerol monostrearate (PGMS), 1.0 to 1.4 parts of Sodium stearoyl-2-lactylate (SSL), 15.4 to 15.8 parts of Polysorbate-60 (PS-60), 15.4 to 15.8 parts of Sorbitan monostearate, 0.12 to 0.16 parts of Sodium dodeceyl sulphate (SDS), 5.0 to 7.0 parts of glycerol and 0.5 to 1.5 parts of lactic acid on 100 parts of water and also a process for preparing the same.

DETAILED DESCRIPTION OF THE PRESENT INVENTION

Accordingly, the present invention provides an emulsifier composition for making improved quality cakes, said emulsifier composition comprising 15.4 to 15.8 parts of Distilled glycerol monostearate (DGMS), 15.4 to 15.8 parts of Poly glycerol monostrearate (PGMS), 1.0 to 1.4 parts of Sodium stearoyl-2-lactylate (SSL), 15.4 to 15.8 parts of Polysorbate-60 (PS-60), 15.4 to 15.8 parts of Sorbitan monostearate, 0.12 to 0.16 parts of Sodium dodeceyl sulphate (SDS), 5.0 to 7.0 parts of glycerol and 0.5 to 1.5 parts of lactic acid on 100 parts of water.

In an embodiment of the present invention, the composition comprises 15.6 parts of Distilled glycerol monostearate (DGMS), 15.6 parts of Poly glycerol monostrearate (PGMS), 1.2 parts of Sodium stearoyl-2-lactylate (SSL), 15.6 parts of Polysorbate-60 (PS-60), 15.6 parts of Sorbitan monostearate 0.14 parts of Sodium dodeceyl sulphate (SDS), 6.0 parts of glycerol and 1.0 parts of lactic acid on 100 parts of water.

In another embodiment of the present invention, the pH of the emulsifier composition is neutral.

In yet another embodiment of the present invention, the incorporation of emulsifier composition in the batter produced a decrease in batter density and an increase in fine, uniform and evenly distributed air cells resulting in cakes with an increased specific loaf volume and a decreased crumb firmness value.

In still another embodiment of the present invention, the cake thus obtained has crumb firmness value in the range of 950–1175 g.

In a further embodiment of the present invention, the cake thus obtained has an overall sensory score of 93%.

The present invention also provides a process for preparing an emulsifier composition for making improved quality cakes, said process comprising the steps of:

(a) mixing 15.4 to 15.8 parts of Distilled glycerol monostearate (DGMS), 15.4 to 15.8 parts of Poly glycerol monostrearate (PGMS), 1.0 to 1.4 parts of Sodium stearoyl-2-lactylate (SSL), 15.4 to 15.8 parts of Polysorbate-60 (PS-60) and 15.4 to 15.8 parts of Sorbitan monostearate with 100 parts of water;

(b) heating the aqueous solution of step (a);

(c) adding 0.12 to 0.16 parts of Sodium dodeceyl sulphate (SDS), 5.0 to 7.0 parts of glycerol and 0.5 to 1.5 parts of lactic acid to the heated mixture of step (b) and blending the same to obtain a homogenous mixture, and (d) adjusting the pH of the mixture of step (c), and allowing the same to set to obtain the emulsifier composition.

In an embodiment of the present invention, the emulsifier composition is used to make cakes with improved crumb cell characteristics, volume and specific loaf volume and textural charateristics such as optimum moistness, tenderness and softness.

In another embodiment of the present invention wherein in step (a), 15.6 parts of Distilled glycerol monostearate (DGMS), 15.6 parts of Poly glycerol monostrearate (PGMS), 1.2 parts of Sodium stearoyl-2-lactylate (SSL), 15.6 parts of Polysorbate-60 (PS-60) and 15.6 parts of Sorbitan monostearate are added to 100 parts of water water.

In yet another embodiment of the present invention, the water is heated to 60° C. followed by the addition of emulsifier, SDS, glycerol, lactic acid while stirring. The pH of the mix was adjusted to neutral.

In still another embodiment of the present invention wherein in step (b), the aqueous solution is heated to a temperature of 60° C.

In one more embodiment of the present invention wherein in step (c), 0.14 parts of Sodium dodeceyl sulphate (SDS), 6.0 parts of glycerol and 1.0 parts of lactic acid are added to the hot aqueous solution of step (b).

In one another embodiment of the present invention, the incorporation of emulsifier composition in the batter produced a decrease in batter density and an increase in fine, uniform and evenly distributed air cells resulting in cakes with an increased specific loaf volume and a decreased crumb firmness value.

In another embodiment of the present invention, the cake thus obtained has crumb firmness value in the range of 950–1175 g.

In a further embodiment of the present invention, the cake thus obtained has an overall sensory score of 93%.

Accordingly, the present invention relates to an emulsifier composition for cakes and a method thereof and comprises:

Step 1: Weighing of emulsifiers—Distilled glycerol monostearate (DGMS), Poly glycerol monostrearate (PGMS), Sodium stearoyl-2-lactylate (SSL) Polysorbate-60 (PS-60) and Sorbitan monostearate (SMS).

Step 2: Heating water to 60° C. followed by the addition of weighed emulsifiers, Sodium dodeceyl sulphate (SDS) with stirring followed by addition of glycerol and lactic acid.

Step 3: Adjustment of pH of the mix to neutral.

Step 4: Allowing the emulsifier composition to set so as to form homogenous gel.

Method of Preparation of Emulsifier System

Following formulation was used for preparation of water based emulsifier composition

| INGREDIENTS | Weight (g) |
| --- | --- |
| Distilled glycerol monostearate (DGMS) | 7.8 |
| Poly glycerol monostrearate (PGMS) | 7.8 |
| Sodium stearoyl-2-lactylate (SSL) | 0.6 |
| Polysorbate-60 (PS-60) | 7.8 |
| Sorbitan monostearate (SMS) | 7.8 |
| Glycerol | 3.0 |
| Sodium dodeceyl sulphate (SDS) | 0.07 |
| Lactic acid | 0.5 |
| Water | 50 |

Water is heated to 60° C. followed by addition of emulsifiers with stirring after which SDS, glycerol and lactic acid are added and thoroughly stirred till homogeneous. The pH of the mix was adjusted to neutral.

Cake Formulation

| INGREDIENT | Weight (g) |
| --- | --- |
| Wheat flour | 100 |
| Crystal sugar | 90–110 |
| Egg | 115–125 |
| Shortening | 62–70 |
| Calcium propionate | 0.3–0.5 |
| Baking powder | 0.3–0.5 |
| Salt | 0.3–0.5 |
| Acetic acid | 0.1–0.25 |
| Water | 5–15 ml |
| Essence | |
| Lemon | 2–2.5 ml |
| Vanilla | 2–2.5 ml |
| Emulsifier composition | 4–6 |

1. Along with flour calcium propionate, baking powder and salt were sifted.
2. Fat and flour were mixed for 5 min in III speed (135 rpm) in mixer.
3. Egg, crystal sugar and emulsifier/developed emulsifier system was whipped for 5–6 min in III speed (135 rpm).
4. The egg mixture was transferred to fat-flour mixture in three parts while mixing for 3 min at I speed (59 rpm) till homogeneous.
5. Finally essence, water and acetic acid were added and mixed at I speed (59 rpm) for 1 min.
6. 425 g batter was scaled and the cake was baked at 180° C. for 1 h.

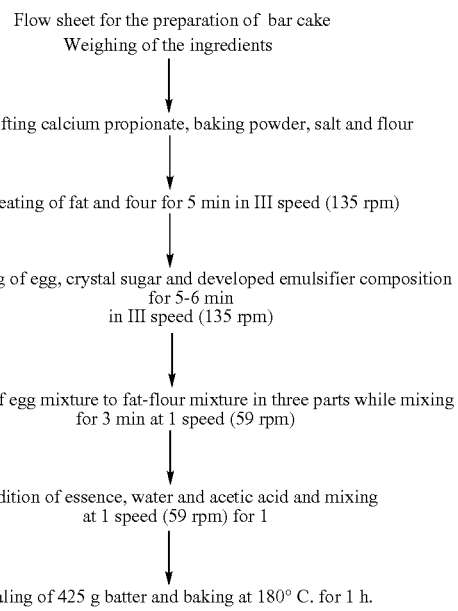

Flow sheet for the preparation of bar cake
Weighing of the ingredients
↓
Sifting calcium propionate, baking powder, salt and flour
↓
Beating of fat and four for 5 min in III speed (135 rpm)
↓
Whipping of egg, crystal sugar and developed emulsifier composition for 5-6 min in III speed (135 rpm)
↓
Addition of egg mixture to fat-flour mixture in three parts while mixing for 3 min at 1 speed (59 rpm)
↓
Addition of essence, water and acetic acid and mixing at 1 speed (59 rpm) for 1
↓
Scaling of 425 g batter and baking at 180° C. for 1 h.

In an embodiment of the present invention, the emulsifiers selected may be Distilled glycerol monostearate (DGMS), Poly glycerol monostrearate (PGMS), Sodium stearoyl-2-lactylate (SSL), Polysorbate-60 (PS-60) and Sorbitan monostearate (SMS).

In an another embodiment of the present invention, Sodium dodeceyl sulphate (SDS) and glycerol may be selected as stabilising agent for the emulsifiers composition thereof.

In yet another embodiment of the present invention, in the preparation of emulsifier composition, lactic acid may be selected as a protective agent against microorganisms.

In another embodiment of the present invention, in the preparation of emulsifier composition, Distilled glycerol monostearate (DGMS), Poly glycerol monostrearate (PGMS), Sodium stearoyl-2-lactylate (SSL), Polysorbate-60 (PS-60), Sorbitan monostearate (SMS), Sodium dodeceyl sulphate (SDS), glycerol and lactic acid may be added to water which is heated to 60° C. and stirred till homogeneous.

In still another embodiment of the present invention, the pH of the emulsifier composition may be adjusted to neutral.

One more embodiment of the invention provides an improved cake composition comprising the following ingredients parts by weight:

| a) Wheat flour | 95–105 |
| --- | --- |
| b. Crystal sugar | 95–105 |
| c. Egg | 110–130 |
| d. Shortening | 60–70 |
| e. Calcium propionate | 0.25–1.25 |
| f. Baking powder | 0.25–1.25 |
| g Salt | 0.25–1.00 |
| h Acetic acid | 0.05–0.25 |
| i. Water | 8–12 |
| j. Essence | |
| Lemon | 2.0–3.0-ml |
| Vanilla | 1.75–3.25-ml |
| k. Emulsifier composition | 4.0–12.0 |

Evaluation of Cake Batter and Cakes a) Evaluation of Cake Batters:

1. Batter density—the batter density of different batters containing individual emulsifier and emulsifier composition was calculated by:

$$\text{Batter density (g/cc)} = \frac{\text{Weight of batter}}{\text{Volume of container}}$$

2. Microscopic examination—Cake batters prepared with different individual emulsifier and developed emulsifier composition along with control were examined under Phase Contrast Microscope (Olympus Model BX 40) magnification 10× for incorporation of air cells.

b) Evaluation of Cake:

1. Volume: The volume was measured by the rape-seed displacement method.

2. Specific volume of cake: Volume of cake was taken and weight was noted. Ratio of volume to weight gives the specific volume:

$$\text{Specific volume (ml/g)} = \frac{\text{Volume in ml}}{\text{Weight of the cake in g}}$$

3. Sensory evaluation: The bar cake was evaluated by a panel of judges. The score card for evaluation is given below:

Score Card for Sensory Evaluation of Cake

| Parameter | Score |
| --- | --- |
| 1. Crust color | Pale brown, Golden brown, dark brown |
| 2. Crumb cells | |
| a. Uniformity | 10 |
| b. Size | 10 |
| c. Cell wall thickness | 10 |
| 3. Grain | 10 |
| 4. Texture | |
| a. Moistness | 10 |
| b. Tenderness | 10 |
| c. Softness | 20 |
| 5. Crumb color | 10 |
| 6. Flavor | 10 |
| Total | 100 | d. Texture studies: Texture studies were carried out using "Texture Analyzer" (Stable Micro System). Four samples of 1-inch thickness of cake were used for recording texture. The set parameters of the instrument were: speed of plunger—100 mm/min and load cell—5 Kg. Force required to bring 25% compression was recorded and average of 4 values was taken.

The following examples are provide for illustration only and should not be construed to limit the scope of the invention.

EXAMPLE 1

Cake Formulation

| INGREDIENT | Weight (g) |
| --- | --- |
| Wheat flour | 100 |
| Crystal sugar | 100 |
| Egg | 120 |
| Shortening | 66 |
| Calcium propionate | 0.5 |
| Baking powder | 0.5 |
| Salt | 0.5 |
| Acetic acid | 0.2 |
| Water | 10 |
| Essence | |
| Lemon | 2.5 ml |
| Vanilla | 2.5 ml |

1. Along with flour calcium propionate, baking powder and salt were sifted
2. Fat and flour were mixed for 5 min in III speed (135 rpm) in mixer
3. Egg, crystal sugar and emulsifier/developed emulsifier system was whipped for 5–6 min in III speed (135 rpm)
4. The egg mixture was transferred to fat-flour mixture in three parts while mixing for 3 min at I speed (59 rpm) till homogeneous
5. Finally essence, water and acetic acid were added and mixed at I speed (59 rpm) for 1 min
6. 425 g batter was scaled and the cake was baked at 180° C. for 1 h The physical characteristics of the cake are as follows: cake-weight 380.10 g; volume 1300 cc, specific loaf volume 3.42 cc/g, batter density 0.93 g/cc and texture 1430 g. the overall sensory score was 70.5 out of 100 (Table 1).

EXAMPLE 2

Cake Formulation

| | Weight (g) |
| --- | --- |
| Wheat flour | 100 |
| Crystal sugar | 100 |
| Egg | 120 |
| Shortening | 66 |
| Calcium propionate | 0.5 |
| Baking powder | 0.5 |
| Salt | 0.5 |
| Acetic acid | 0.2 |
| Water | 10 |
| Essence | |
| Lemon | 2.5 ml |
| Vanilla | 2.5 ml |
| Emulsifier composition | 2.0 |

1. Along with flour calcium propionate, baking powder and salt were sifted
2. Fat and flour were mixed for 5 min in III speed (135 rpm) in mixer
3. Egg, crystal sugar and emulsifier gel was whipped for 5–6 min in III speed (135 rpm)

4. The egg mixture was transferred to fat-flour mixture in three parts while mixing for 3 min at I speed (59 rpm) till homogeneous
5. Finally essence, water and acetic acid were added and mixed at I speed (59 rpm) for 1 min
6. 425 g batter was scaled and the cake was baked at 180° C. for 1 h.

The physical characteristics of the cake are as follows: cake weight 380 g; volume 1560 cc, specific loaf volume 4.10 cc/g, batter density 0.87 g/cc and texture 1175 g. The overall sensory score was 83 out of 100 (Table 1).

EXAMPLE 3

Cake Formulation

| | Weight (g) |
|---|---|
| Wheat flour | 100 |
| Crystal sugar | 100 |
| Egg | 120 |
| Shortening | 66 |
| Calcium propionate | 0.5 |
| Baking powder | 0.5 |
| Salt | 0.5 |
| Acetic acid | 0.2 |
| Water | 10 |
| Essence | |
| Lemon | 2.5 ml |
| Vanilla | 2.5 ml |
| Emulsifier composition | 5.0 |

1. Along with flour calcium propionate, baking powder and salt were sifted
2. Fat and flour were mixed for 5 min in III speed (135 rpm) in mixer
3. Egg, crystal sugar and emulsifier/developed emulsifier system was whipped for 5–6 min in III speed (135 rpm)
4. The egg mixture was transferred to fat-flour mixture in three parts while mixing for 3 min at I speed (59 rpm) till homogeneous
5. Finally essence, water and acetic acid were added and mixed at I speed (59 rpm) for 1 min
6. 425 g batter was scaled and the cake was baked at 180° C. for 1 h The physical characteristics of the cake are as follows: cake weight 380 g; volume 1880 cc, specific loaf volume 4.94 cc/g, batter density 0.80 g/cc and texture 950 g. the overall sensory score was 93 out of 100 (Table 1).

EXAMPLE 4

Cake Formulation

| | grams |
|---|---|
| Wheat flour | 100 |
| Crystal sugar | 100 |
| Egg | 120 |
| Shortening | 66 |
| Calcium propionate | 0.5 |
| Baking powder | 0.5 |
| Salt | 0.5 |
| Acetic acid | 0.2 |
| Water | 10 |

-continued

Cake Formulation

| | grams |
|---|---|
| Essence | |
| Lemon | 2.5 ml |
| Vanilla | 2.5 ml |
| Emulsifier composition | 9.0 |

1. Along with flour calcium propionate, baking powder and salt were sifted
2. Fat and flour were mixed for 5 min in III speed (135 rpm) in mixer
3. Egg, crystal sugar and emulsifier was whipped for 5–6 min in III speed (135 rpm)
4. The egg mixture was transferred to fat-flour mixture in three parts while mixing for 3 min at I speed (59 rpm) till homogeneous
5. Finally essence, water and acetic acid were added and mixed at I speed (59 rpm) for 1 min
6. 425 g batter was scaled and the cake was baked at 180° C. for 1 h.

The physical characteristics of the cake are as follows: cake weight 381 g; volume 1630 cc, specific loaf volume 4.27 cc/g, batter density 0.80 g/cc and texture 1120 g. The overall sensory score was 88 out of 110 (Table 1).

The physical appearance and Photomicrographs of control cake and cake prepared with emulsifier composition is shown in FIG. 1.

TABLE 1

Effect of emulsifier composition on the characteristics of cake

| | Weight (g) | Volume (cc) | Specific loaf volume (cc/g) | Batter density (g/cc) | Texture* (g, force) | Total Score (100) |
|---|---|---|---|---|---|---|
| Example 1 (Control) | 380.10 | 1300 | 3.42 | 0.93 | 1430 | 70.5 |
| Example 2 (Emulsifier Composition - 2%) | 380.0 | 1560 | 4.10 | 0.87 | 1175 | 82.0 |
| Example 3 (Emulsifier Composition - 5%) | 380.0 | 1880 | 4.94 | 0.80 | 950 | 93.0 |
| Example 4 (Emulsifier Composition - 9%) | 381.0 | 1630 | 4.27 | 0.83 | 1120 | 88.0 |

*Force required for 25% compression measured using texture analyser.

Emulsifier composition in general brought about a desirable decrease in batter density when compared to the control. The batter density of the control was 0.93 g/cc whereas the batter densities of cake batter with emulsifier composition at 2, 5 and 9% levels were 0.87, 0.80 and 0.83 g/cc respectively. The cake batter with emulsifier composition at 5% level had the lowest density of 0.80 g/cc showing that the batter was light and fluffy owing to good air incorporation and this was reflected in the volume of the cake.

The photomicrographs of the control and emulsifier composition at 5% level were studied. The cake batter showed less number of uneven sized air bubbles (FIG. 1). The cake batter with emulsifier composition possessed more number of air bubbles having uniform size and even distribution in the fat phase.

The performance of emulsifier composition was compared with different commercially available cake gels. As evident from data in Table 2, the emulsifier composition improved the quality of cake to a greater extent than the commercial cake gel with respect to specific loaf volume, crumb grain and texture.

TABLE 2

Effect of emulsifier composition and commercial cake gels on the characteristics of bar cake

| | Weight (g) | Volume (cc) | Specific loaf volume (cc/g) | Batter density (g/cc) | Texture* (g, force) | Total Score (100) |
|---|---|---|---|---|---|---|
| Commercial Gel A | 382.0 | 1610 | 4.21 | 0.87 | 1280 | 81.5 |
| Commercial Gel B | 380.0 | 1680 | 4.42 | 0.84 | 1320 | 83.0 |
| Commercial Gel C | 381.0 | 1800 | 4.72 | 0.82 | 1020 | 89.0 |
| Emulsifier composition | 380.0 | 1880 | 4.94 | 0.80 | 950 | 93.0 |

*Force required for 25% compression measured using texture analyzer.

There was an increase in the specific loaf volumes of cake with the use of emulsifier composition. The specific loaf volume of the control was 3.42 cc/g. The cake containing emulsifier composition at 5% level had the highest specific loaf volume of 4.81 cc/g as against the cakes prepared with 2 and 9% emulsifier composition.

The texture of the cakes improved with use of emulsifier composition. The control had a crumb firmness value of 1430 g. All the cakes with emulsifier composition at varying levels had lower crumb firmness value indicating soft texture. The crumb firmness values for cakes containing emulsifier composition at different levels ranged from 950–1175 g (Table 1). The cake containing the emulsifier composition at 5% level had the lowest crumb firmness value of 950 g which showed that the cake had a very soft texture. The cake had a good volume with golden brown crust, soft, tender, moist crumb with fine air cells. This was reflected in the overall sensory score (Table 1) which highest 93 out of 100. The emulsifier composition (at 5% level) improved the overall quality of the cake than the individual emulsifiers to great extent resulting in an excellent quality of product.

The advantages of the present invention:

The following are the main advantages of the present invention:
1. Incorporation of the emulsifier composition in cake formulation improves the following parameters when compared to the control:
   (a) the crumb cell characteristics of the cake,
   (b) the textural characteristics of the cake such as optimum moistness, tenderness and softness, and
   (c) volume and specific loaf volume of the cake.
2. The baking of the cake is maintained the same. The baking time of the cake is not decreased by removing the shortening agent.
3. There is no replacement of fat while making the cakes. Hence, there is substantial amount of cost savings.

The invention claimed is:

1. An emulsifier composition for making improved quality cakes, said emulsifier composition comprising 15.4 to 15.8 parts of Distilled glycerol monostearate (DGMS), 15.4 to 15.8 parts of Poly glycerol monostrearate (PGMS), 1.0 to 1.4 parts of Sodium stearoyl-2-lactylate (SSL), 15.4 to 15.8 parts of Polysorbate-60 (PS-60), 15.4 to 15.8 parts of Sorbitan monostearate, 0.12 to 0.16 parts of Sodium dodeceyl sulphate (SDS), 5.0 to 7.0 parts of glycerol and 0.5 to 1.5 parts of lactic acid on 100 parts of water.

2. An emulsifier composition as claimed in claim 1, wherein the composition comprises 15.6 parts of Distilled glycerol monostearate (DGMS), 15.6 parts of Poly glycerol monostrearate (PGMS), 1.2 parts of Sodium stearoyl-2-lactylate (SSL), 15.6 parts of Polysorbate-60 (PS-60), 15.6 parts of Sorbitan monostearate 0.14 parts of Sodium dodeceyl sulphate (SDS), 6.0 parts of glycerol and 1.0 parts of lactic acid on 100 parts of water.

3. An emulsifier composition as claimed in claim 1, wherein the pH of the emulsifier composition is neutral.

4. An emulsifier composition as claimed in claim 1, wherein the incorporation of emulsifier composition in the batter produced a decrease in batter density and an increase in fine, uniform and evenly distributed air cells resulting in cakes with an increased specific loaf volume and a decreased crumb firmness value.

5. An emulsifier composition as claimed in claim 4, wherein the cake thus obtained has crumb firmness value in the range of 950–1175 g.

6. An emulsifier composition as claimed in claim 4, wherein the cake thus obtained has an overall sensory score of 93%.

7. A process for preparing an emulsifier composition for making improved quality cakes, said process comprising the steps of:
   (a) mixing 15.4 to 15.8 parts of Distilled glycerol monostearate (DGMS), 15.4 to 15.8 parts of Poly glycerol monostrearate (PGMS), 1.0 to 1.4 parts of Sodium stearoyl-2-lactylate (SSL), 15.4 to 15.8 parts of Polysorbate-60 (PS-60) and 15.4 to 15.8 parts of Sorbitan monostearate with 100 parts of water;
   (b) heating the aqueous solution of step (a);
   (c) adding 0.12 to 0.16 parts of Sodium dodeceyl sulphate (SDS), 5.0 to 7.0 parts of glycerol and 0.5 to 1.5 parts of lactic acid to the heated mixture of step (b) and blending the same to obtain a homogenous mixture, and
   (d) adjusting the pH of the mixture of step (c), and allowing the same to set to obtain the emulsifier composition.

8. A process as claimed in claim 7, wherein the emulsifier composition is used to make cakes with improved crumb cell characteristics, volume and specific loaf volume and textural charateristics such as optimum moistness, tenderness and softness.

9. A process as claimed in claim 7 wherein in step (a), 15.6 parts of Distilled glycerol monostearate (DGMS), 15.6 parts of Poly glycerol monostrearate (PGMS), 1.2 parts of Sodium stearoyl -2-lactylate (SSL), 15.6 parts of Polysorbate-60 (PS-60) and 15.6 parts of Sorbitan monostearate are added to 100 parts of water water.

10. A process as claimed in claim 7, wherein the water is heated to 60° C. followed by the addition of emulsifier, SDS, glycerol, lactic acid while stirring. The pH of the mix was adjusted to neutral.

11. A process as claimed in claim 7 wherein in step (b), the aqueous solution is heated to a temperature of 60° C.

12. A process as claimed in claim 7 wherein in step (c), 0.14 parts of Sodium dodeceyl sulphate (SDS), 6.0 parts of glycerol and 1.0 parts of lactic acid are added to the hot aqueous solution of step (b).

13. A process as claimed in claim 7, wherein the incorporation of emulsifier composition in the batter produced a decrease in batter density and an increase in fine, uniform and evenly distributed air cells resulting in cakes with an increased specific loaf volume and a decreased crumb firmness value.

14. A process as claimed in claim 7, wherein the cake thus obtained has crumb firmness value in the range of 950–1175 g.

15. A process as claimed in claim 7, wherein the cake thus obtained has an overall sensory score of 93%.

* * * * *